United States Patent
Chen et al.

(10) Patent No.: US 10,090,671 B2
(45) Date of Patent: Oct. 2, 2018

(54) SHORT CIRCUIT PROTECTION FOR DATA INTERFACE CHARGING

(71) Applicant: Dialog Semiconductor Inc., Campbell, CA (US)

(72) Inventors: Yimin Chen, Campbell, CA (US); Mengfei Liu, Campbell, CA (US); Duc Doan, Campbell, CA (US); Xiaoyong Zhang, Campbell, CA (US); Jianming Yao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 216 days.

(21) Appl. No.: 15/212,124

(22) Filed: Jul. 15, 2016

(65) Prior Publication Data

US 2018/0019587 A1   Jan. 18, 2018

(51) Int. Cl.
*H02J 7/06* (2006.01)
*H02J 7/24* (2006.01)
*H02H 7/12* (2006.01)
*H02M 3/335* (2006.01)
*H02J 7/00* (2006.01)

(52) U.S. Cl.
CPC .......... *H02H 7/1213* (2013.01); *H02J 7/0052* (2013.01); *H02M 3/33576* (2013.01); *H02J 2007/006* (2013.01); *H02J 2007/0059* (2013.01); *H02J 2007/0062* (2013.01)

(58) Field of Classification Search
CPC .................................................... H02H 7/1213
USPC ............................................................ 320/163
See application file for complete search history.

(56) References Cited

U.S. PATENT DOCUMENTS

2006/0274468 A1* 12/2006 Phadke .................. H02H 9/001
                                                                                                        361/93.1
2012/0293903 A1* 11/2012 Liao ...................... H02H 9/004
                                                                                                        361/93.9

* cited by examiner

*Primary Examiner* — Edward Tso
*Assistant Examiner* — Ahmed Omar
(74) *Attorney, Agent, or Firm* — Haynes & Boone, LLP

(57) ABSTRACT

A switching power converter is provided with an overvoltage protection circuit that softly switches on a power bus switch during a soft-start period responsive to a device connecting to a data cable for receiving power over a power bus coupled to the power bus switch.

20 Claims, 6 Drawing Sheets

SHORT CIRCUIT PROTECTION FOR DATA INTERFACE CHARGING

TECHNICAL FIELD

This application relates to power converters, and more particularly to a short circuit protection circuit for a power converter charging a device through a data interface.

BACKGROUND

A flyback switching power converter is commonly used to charge mobile devices as the converter's transformer provides safe isolation from AC household current. It is conventional for the switching power converter to couple to the mobile device being charged through a standard interface such as a Universal Serial Bus (USB) interface. With regard to the delivery of power, a USB cable can only provide a certain amount of current. For example, the USB 2.0 standard allows for a maximum output current of 500 mA whereas the USB type C Power Delivery (PD) standard allows a maximum output current of 5 A (depending upon the particular cable configuration) over a Vbus terminal. With the delivery of so much power, the USB type C protocol requires the power converter supplying power to the USB cable to include a Vbus switch that when closed isolates the power converter output from the Vbus terminal.

The operation of the Vbus switch depends upon whether the upstream facing port (UFP) of the USB cable is connected to a mobile device for receiving power. The power converter connects to the downstream facing port (DFP) of the USB cable. To detect the connection of the mobile device to the UFP, the power converter monitors the voltage of a configuration channel (CC) terminal at the DFP. When connected, the mobile device causes the CC terminal at the DFP to discharge for a de-bouncing period. The power converter reacts to the expiration of the de-bouncing period by closing the VBus switch from its default open state so that power may be supplied over the Vbus terminal. Although the resulting high power delivery over the USB cable is thus advantageous, problems have arisen with regard to its implementation. For example, the USB interface may get dirty such that a dust particle or other slightly conductive object couples between the Vbus pin (the pin delivering the output voltage) and one of the signaling or ground pins. Alternatively, the USB cable itself may become frayed from twisting by a user such that a slightly conductive path exists between the Vbus wire and one of the remaining wires. The result is either a "hard short" or a "soft short" between the Vbus terminal and one of the remaining USB terminals. As compared to a hard short, a soft short has a relatively high impedance between the corresponding pins (or wires) in the USB cable or interface.

An example USB type C system 101 is shown in FIG. 1. A flyback switching power converter 100 includes a primary-side controller 125 and a secondary-side controller 120. Primary side controller 125 regulates the switching of a power switch transistor S1 to provide a 5.0V Vbus voltage for the charging of a Vbus terminal in a USB connector 110 for USB cable 115. Power switch transistor S1 is in series with a primary winding T1 of a transformer having a secondary winding T2. While power switch transistor S1 conducts in response to being switched on by controller 125, an output diode coupled to the secondary winding T2 is reverse-biased and thus non-conducting. But when power switch transistor S1 opens, the voltage reverses across secondary winding T2 such that the output diode D1 becomes forward-biased and conducting. The resulting charge cannot flow into the Vbus terminal while a Vbus switch transistor S2 is non-conducting. To allow reversibility of the cable connections, USB connector 110 includes two configuration channel terminals: a CC1 terminal and a CC2 terminal. Depending upon the connection orientation, a client device 105 will discharge one of the CC terminals. Secondary controller 120 reacts to this discharge by closing Vbus switch transistor S2 after the de-bouncing period. But note that output capacitor C1 is charged to the 5.0 V power supply voltage. Should a short circuit 140 provide a conductive path from the Vbus terminal to a ground (GND) terminal, output capacitor C1 will discharge a short circuit current through Vbus switch transistor S2 and short circuit 140.

The resulting short circuit waveforms for system 101 are shown in FIG. 2. The CC1 pin voltage discharges at a time t0 due to the connection of client device 105 to USB cable 115. After expiration of the de-bouncing period, secondary-side controller 120 switches Vbus switch transistor S2 on by pulsing its gate voltage high at a time t1. The Vbus terminal voltage rises in response the Vbus switch transistor S2 switching on. Due to the presence of short circuit 140, the output current (I_discharge) through the Vbus switch transistor S2 pulses above its maximum current rating. This relatively large output current quickly pulls the power supply voltage (VCC) stored across output capacitor C1 (VCC) below a primary-side controller reset threshold at a time t2. Primary-side controller 125 then resets such that secondary-side controller 120 then re-asserts the Vbus switch transistor gate voltage at a time t3. The output current again spikes and the resulting drop in VCC causes another reset, and so on. This repetitive exposure to such large output currents eventually causes Vbus switch transistor S2 to fail and assume an irreversible constant-on state or an irreversible constant-off state. Both of these states are of course undesirable.

Accordingly, there is a need in the art for improved short circuit protection for switching power converters that charge over data interfaces.

SUMMARY

A switching power converter controller controls a power bus switch to protect against soft circuits in a data cable including a power bus for charging a client device. The default state of the power bus switch is off until the controller detects that the client device has connected to the data cable. The controller then initiates a soft-start of the power bus switch for a soft-start period after a de-bouncing period. During the soft-start of the power bus switch, the power bus switch is more resistive than when driven fully on. If the power bus voltage rises above a power bus rise threshold voltage during the soft-start period, the controller drives the power bus switch fully on. Conversely, if a power supply voltage output from the switching power converter gated by the power bus switch drops below a short circuit detection threshold voltage during the soft-start period, the controller opens the power bus switch. The power bus switch is thus never subjected to excessive output currents even if a short circuit exists in the data cable.

These advantageous features may be better appreciated from a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for short circuit protection for charging through data cables, a power converter is provided with a power bus switch that gates whether the power converter drives an output current through a downstream port onto a power bus within the data cable. The following discussion will assume without loss of generality that the power converter is a flyback power converter. But it will be appreciated that the short circuit protection disclosed herein may be readily applied to other types of a power converters. For example, a buck converter or a buck/boost power converter is readily adapted to practice the short circuit protection technique disclosed herein.

A secondary-side controller in the flyback power converter is configured to open the power bus switch in response to an indication that a client device to be charged has connected itself to an upstream port on the data cable. The secondary-side controller will be referred to below as a secondary controller for brevity. The secondary controller is further configured to soft-start the power bus switch in response to the connection indication. The soft-start extends over a soft-start period during which the power bus switch is more resistive than when fully driven on. Should there be a short circuit in the data cable or its interfaces, the power bus switch will thus conduct less short circuit current during the soft-start period than it would have had it been driven fully on. The soft-start process thus advantageously protects the power bus switch from overcurrent damage as will be explained further herein.

To test for the presence of a short circuit during the soft-start process, the secondary controller tests whether a power supply voltage VCC supplied to the power bus switch drops below a short-circuit threshold voltage during the soft-start process. If there is no indication of a short circuit, the secondary controller drives the power bus switch fully on. Conversely, the secondary controller switches the power bus switch off if there is an indication of a short circuit during the soft-start process. In this fashion, the problems of repeatedly stressing the power bus switch until it fails either irreversibly on or off due to a short circuit within the data cable are solved.

Figure 1:
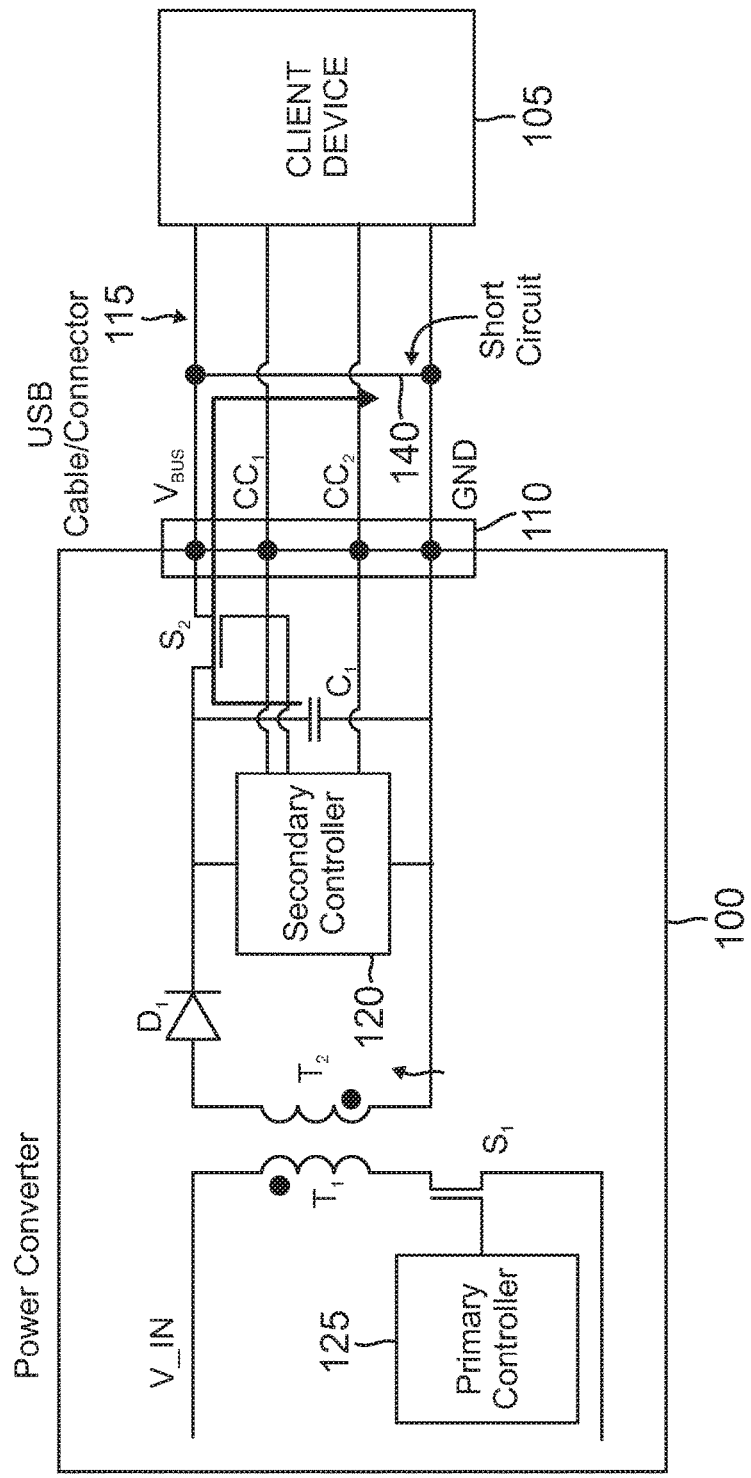
FIG. 1 is a block diagram of a conventional flyback converter experiencing a short circuit upon the closing of the Vbus switch transistor in response to the connection of a client device for charging over a USB type C cable.
Figure 2:
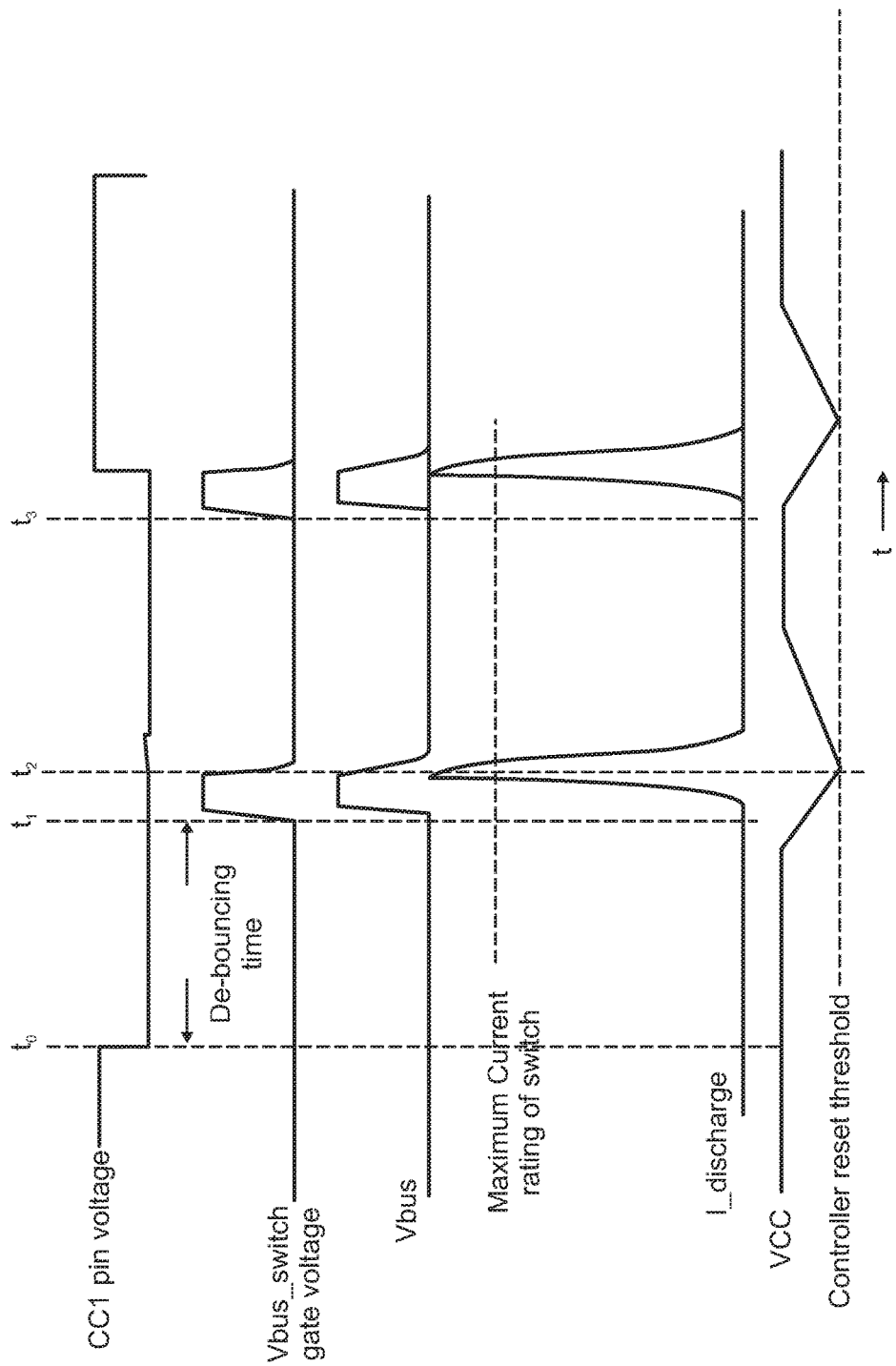
FIG. 2 illustrates some of the voltage and current waveforms during a short circuit condition for the flyback converter of FIG. 1.
Figure 3:
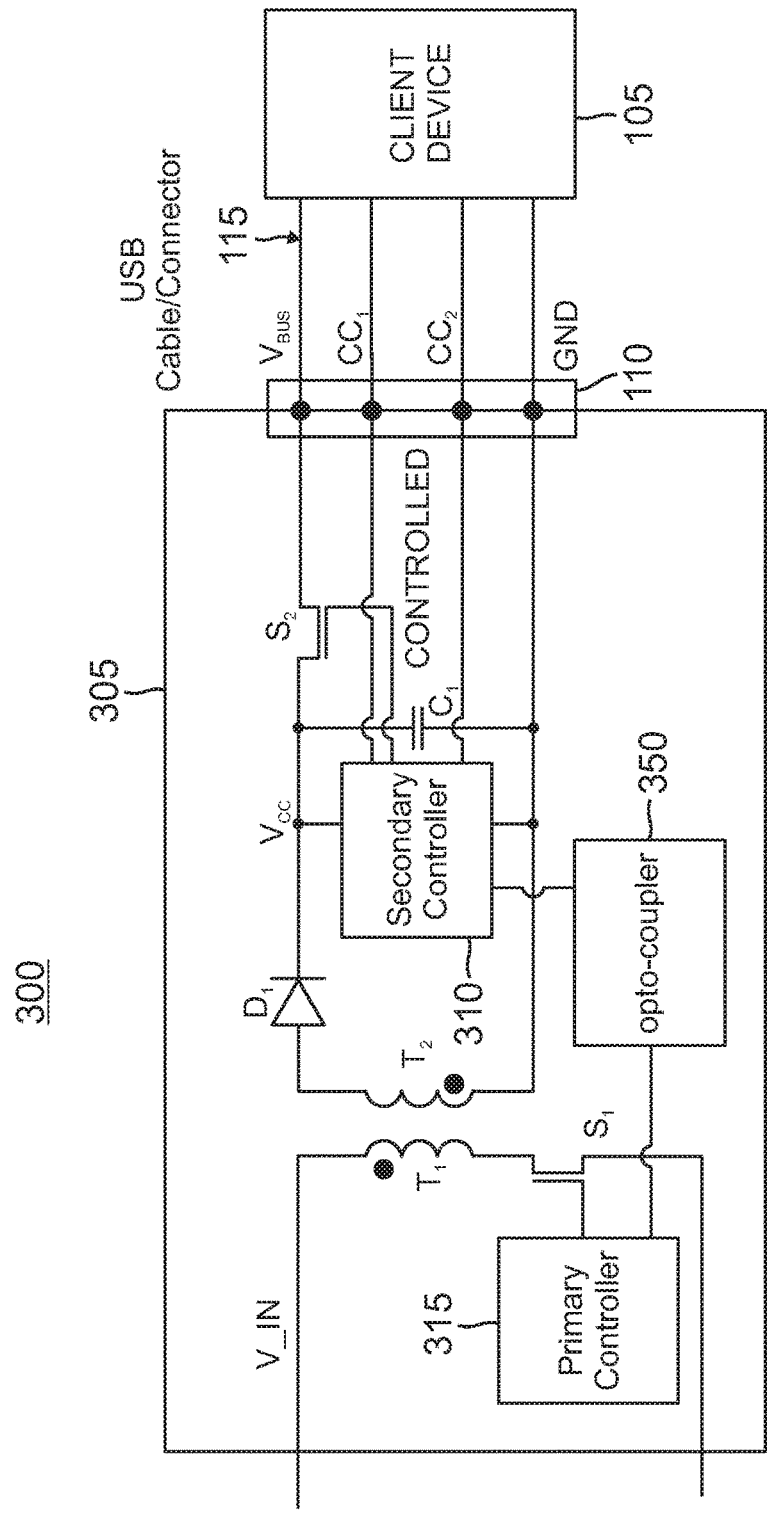
FIG. 3 is a diagram of an example system including a flyback power converter configured to practice a short-circuit protection technique in accordance with an aspect of the disclosure.

In the following example embodiments, the data cable is a USB type-C cable. However, it will be appreciated that the short-circuit protection circuits and methods disclosed herein are widely applicable to the protection of other types of data cables including a power bus that is isolated from a power converter through a power bus switch. An example system 300 is shown in FIG. 3 that includes a flyback converter 305 having a primary controller 315 that controls the switching of a power switch transistor S1 coupled in series with a primary winding T1 of a transformer also having a secondary winding T2. A rectified input voltage Vin causes a magnetizing current to flow through primary winding T1 when primary controller 315 closes power switch transistor S1. When primary controller 315 then opens power switch transistor S1, an output diode D1 connected to a terminal of the secondary winding T2 becomes forward-biased such that an output current charges an output capacitor C1 with a power supply voltage VCC. It will be appreciated by those of ordinary skill in the art that output diode D1 may be replaced by a synchronous rectifier switch in alternative embodiments.

The power supply voltage VCC stored across an output capacitor C1 cannot drive a Vbus power terminal in a downstream facing port (DFP) 110 of a USB cable 115 until a secondary controller 310 detects the discharge of either a CC1 terminal or a CC2 terminal in DFP port 110. The default, no device connection to USB cable 115 state of a Vbus power switch transistor S2 is off. But when secondary controller 310 detects the discharge of either the CC1 terminal or the CC2 terminal (which one being discharged depending upon the particular orientation of USB cable 115 as connected by a user), secondary controller 310 begins a soft-start of Vbus power switch transistor S2 after the expiration of the de-bouncing period.

Figure 4:
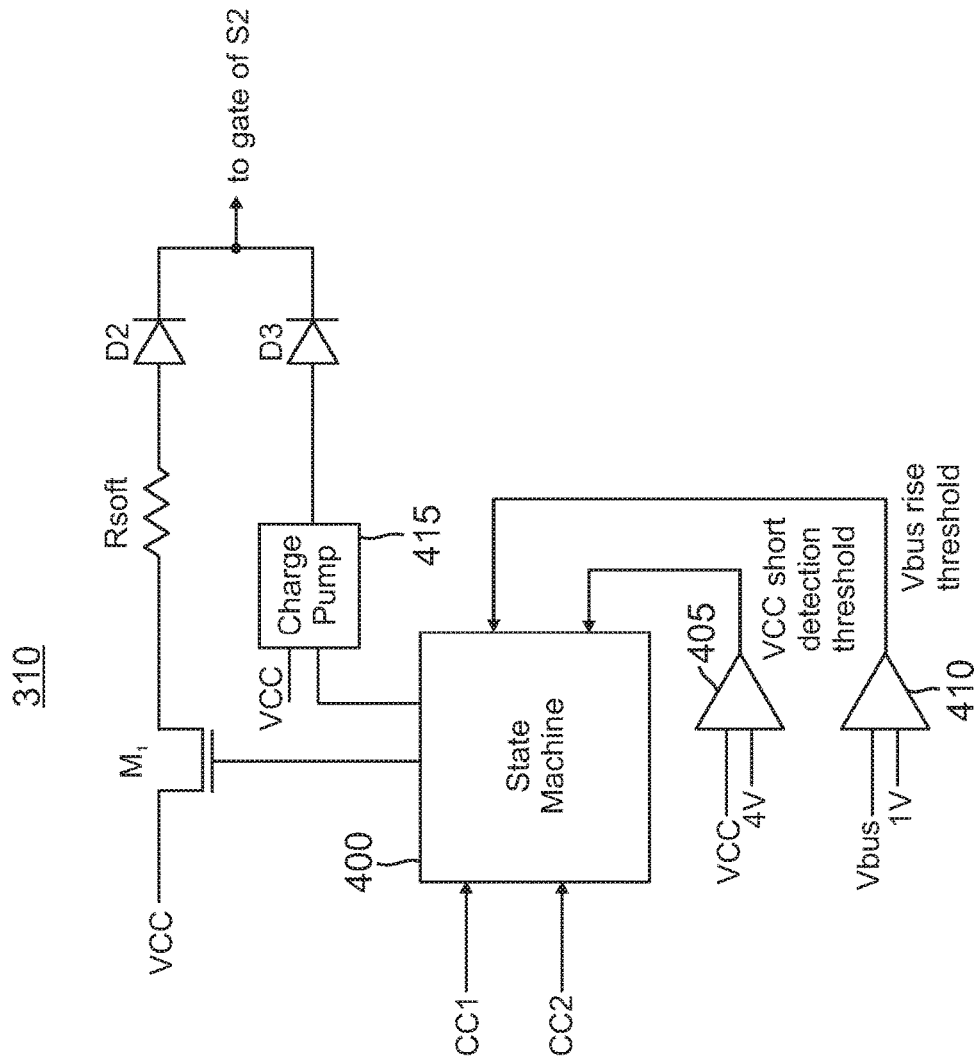
FIG. 4 is a circuit diagram of the secondary controller in the flyback converter of FIG. 3.

Secondary controller 310 is shown in more detail in FIG. 4. A state machine 400 responds to the discharge of either the CC1 terminal or the CC2 terminal by beginning the soft-start period after the expiration of the de-bouncing period by switching on a soft-start switch transistor M1 that couples between an output node for the output capacitor C1 carrying the power supply voltage VCC and a soft-start resistor Rsoft having a suitably high resistance such as 20K Ω. An output terminal of soft-start resistor Rsoft couples through a protection diode D2 to drive the gate of Vbus switch transistor S2. Due to the voltage drop across resistor Rsoft, the switching on of soft-start switch transistor M1 does not fully switch on Vbus switch transistor S2 but instead forces it into the triode operating region such that the Vbus switch transistor S2 is substantially more resistive than it would be if instead it were fully switched on as in the saturation mode of operation.

State machine 400 is configured to maintain soft-start switch transistor M1 on during a duration of the soft-start period such as 2 msec. But it is desirable to terminate the soft-start period if there are no short circuits. Secondary controller 310 thus includes a comparator 410 that compares the Vbus voltage to a suitable Vbus rise threshold voltage such as 1 V. If there were a short circuit, Vbus could not rise past 1V during the short-circuit period. Thus, secondary controller 310 reacts to an indication from comparator 410 that Vbus has exceeded the Vbus rise threshold voltage by driving Vbus switch transistor S2 fully on even through the soft-start period has not yet expired. To be sure that Vbus switch transistor S2 is fully on, state machine 400 enables a charge pump 415 to begin switching with the VCC power supply voltage to provide an increased drive voltage that passes through a diode D3 to fully switch on Vbus switch transistor S2. For example, in an embodiment in which VCC equals 5.0 V, the increased drive voltage is greater than VCC such as 7 V. In this fashion, the Vbus switch transistor S2 is fully switched on if Vbus rises past the Vbus rise threshold voltage during the soft-start period.

To detect for the presence of a short circuit during the soft-start period, state machine 400 monitors the VCC power supply voltage through a comparator 405 to determine whether VCC has dropped below a VCC short circuit detection threshold voltage. For example, if the default voltage for VCC is 5.0 V, the VCC short circuit detection threshold voltage may be 4 V. Such a VCC short circuit detection threshold voltage is crossed due to the rapid discharge of output current from the output capacitor C1 through the short circuit in USB cable 115 (or its interfaces) during the soft-start period. State machine 400 reacts to the lowering of VCC below the VCC short circuit threshold voltage by switching off soft-start switch transistor M1 so that Vbus switch transistor S2 switches off and is not exposed to dangerously high output currents. To assist the switching off of Vbus switch transistor S2 in the presence of a short, controller 310 may include a discharge transistor (not illustrated) coupled between the gate of Vbus switch transistor S2 and ground. Controller 310 may thus switch on the discharge transistor while switching off the soft-start switch transistor M1.

In general, it is preferable if Vbus switch transistor S2 has a sufficiently low threshold voltage such that it can drive Vbus higher than the Vbus rise threshold voltage during the soft-start period in the absence of a short circuit. But the process corner for Vbus transistor S2 may be such that it has a higher than normal threshold voltage. It thus may be the case that the soft-start period has expired without any indication of a short circuit through the comparison of VCC to the VCC short circuit threshold voltage yet Vbus remains below the Vbus rise threshold voltage. Such a condition may result from Vbus switch transistor S2 having a relatively high threshold voltage such that it remained too resistive during the soft-start period to charge Vbus higher than the Vbus rise threshold voltage. State machine 400 is thus configured to enable charge pump 415 at the expiration of the soft-start period if Vbus is less than the Vbus rise threshold voltage and there has been no indication of a short circuit such that VCC remains above the VCC short circuit threshold voltage. In this fashion, Vbus switch transistor S2 is driven fully on despite its relatively high threshold voltage.

Figure 5:
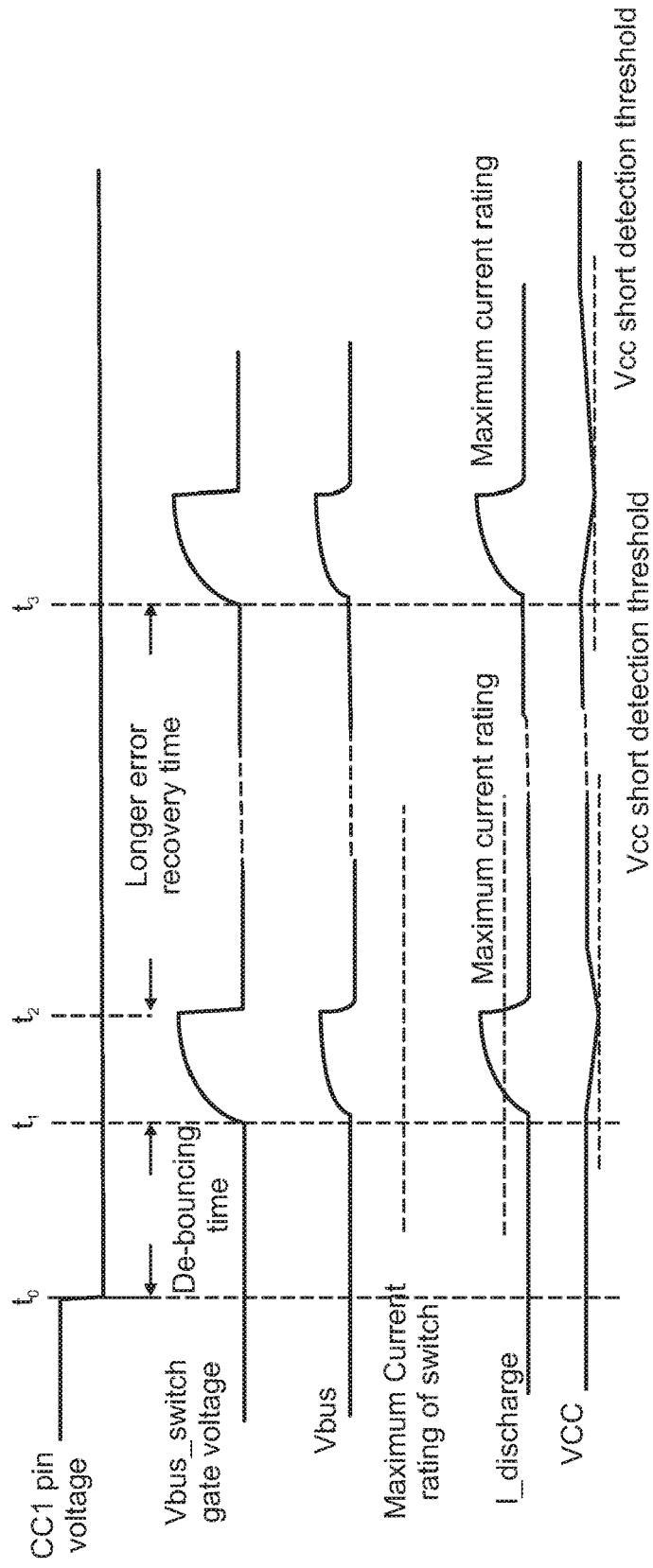
FIG. 5 illustrates some of the voltage and current waveforms during a short circuit condition for the flyback power converter of FIG. 3.

Operation of secondary controller 310 in the presence of a short circuit may be better appreciated through an examination of the voltage and current waveforms shown in FIG. 5. At time t0, a client device connects to the USB cable and discharges the CC1 terminal. When the de-bouncing period ends at a time t1, the secondary controller switches on the soft-start switch transistor M1 so that the gate voltage for the Vbus switch transistor S2 begins ramping upward. The Vbus voltage also begins ramping up but does not exceed the Vbus rise threshold voltage due to the presence of a short circuit, which causes the output current I_discharge through the Vbus switch transistor S2 to exceed the output current limit for the power converter but not to exceed the maximum current rating of Vbus switch transistor S2. The relatively robust output current supplied by the output capacitor C1 causes the power supply voltage VCC to drop below the VCC short circuit detection threshold voltage at a time t2. In response to the crossing of the VCC short circuit detection threshold voltage, the secondary controller switches off the Vbus switch transistor S2 by discharging its gate voltage. The secondary controller then enters a relatively long error recovery period (e.g., 2 sec) whereupon the short circuit protection process may repeat at a time t3.

Referring again to FIG. 3, secondary controller 310 may communicate with primary controller 315 through a ground-isolating communication channel such as an optocoupler 350. For example, suppose that no short circuits have been detected such that the Vbus voltage rises to its nominal value such as 5.0 V. Client device 105 may indicate it supports a higher charging voltage during an enumeration process between secondary controller 310 and client device 105. Secondary controller 310 then signals primary controller 315 to change its regulation of the power switch transistor S1 so that the higher value for Vbus is achieved. Primary controller 315 may be configured to practice primary-only feedback or may receive feedback information on Vbus through another optocoupler (not illustrated). In addition, secondary controller 310 may be configured to alert primary controller 315 that it has detected a short circuit condition. Primary controller 315 may then react accordingly such as by resetting.

Figure 6:
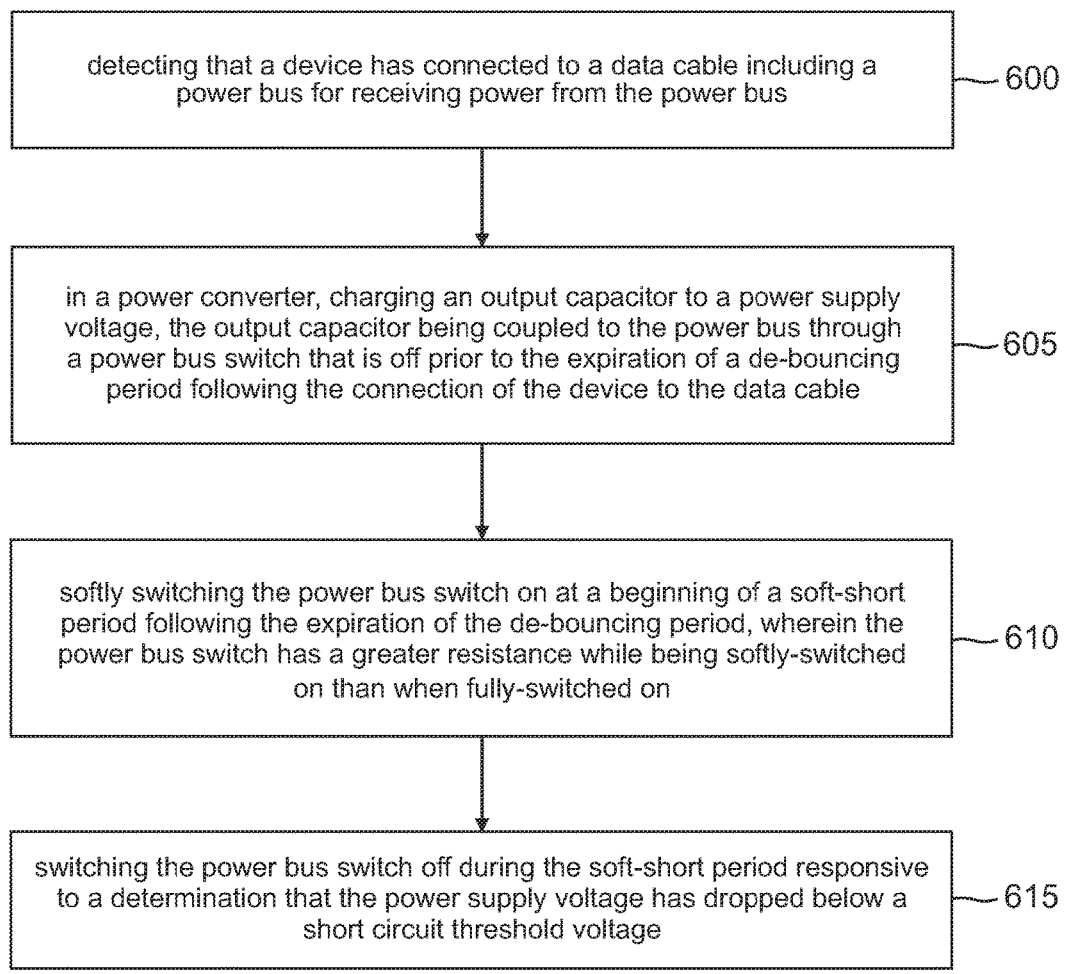
FIG. 6 is a flowchart of a method of operation for the flyback power converter of FIG. 3.

A method of operation for short circuit protection of a data cable including a power bus for charging a device will now be discussed with regard to the flowchart of FIG. 6. The method includes an act 600 of detecting that a device has connected to a data cable including a power bus for receiving power from the power bus. The detection of the discharge of either the CC1 terminal or the CC2 terminal as discussed with regard to FIG. 3 is an example of act 600. The method also includes an act 605 of, in a power converter, charging an output capacitor to a power supply voltage, the output capacitor being coupled to the power bus through a power bus switch that is off prior to the expiration of a de-bouncing period following the connection of the device to the data cable. The charging of output capacitor C1 in flyback power supply 100 is an example of act 605. The method further includes an act 610 of softly switching on the power bus switch at a beginning of a soft-start period following the expiration of the de-bouncing period, wherein the power bus switch has a greater resistance while being softly-switched on than when fully-switched on. The charging of the gate of Vbus power switch transistor S2 through the soft-start resistor Rsoft as discussed with regard to FIG. 4 is an example of act 610. Finally, the method includes an act 615 of switching the power bus switch off during the soft-start period responsive to a determination that the power supply voltage has dropped below a short circuit threshold voltage. The switching off of the power bus switch transistor S2 at time t2 as discussed with regard to FIG. 5 is an example of act 615.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method, comprising:
   detecting that a device has connected to a data cable including a power bus for receiving power from the power bus;
   in a power converter, charging an output capacitor to a power supply voltage, the output capacitor being coupled to the power bus through a power bus switch that is off prior to an expiration of a de-bouncing period following the connection of the device to the data cable;

softly switching on the power bus switch at a beginning of a soft-start period following the expiration of the de-bouncing period, wherein the power bus switch has a greater resistance while being softly-switched on than when fully-switched on; and switching the power bus switch off during the soft-start period responsive to a determination that the power supply voltage has dropped below a short circuit threshold voltage.

2. The method of claim 1, wherein softly switching on the power bus switch comprises switching on a soft-switch transistor to couple a gate of a power bus switch transistor through a soft-start resistor to a node charged to the power supply voltage.

3. The method of claim 2, further comprising:
comparing the power supply voltage to a rise threshold voltage during the soft-start period; and
fully switching on the power bus switch transistor responsive to the comparison indicating that the power supply voltage is greater than the rise voltage threshold.

4. The method of claim 3, wherein the data cable is a USB cable.

5. The method of claim 4, wherein the USB cable is a USB type C cable.

6. The method of claim 1, wherein charging the output capacitor to the power supply voltage comprises charging the output capacitor through a second stage of a flyback converter.

7. The method of claim 1, wherein detecting that the device has connected to the data cable comprising detecting that a configuration channel terminal in a USB interface has been discharged to ground.

8. The method of claim 1, further comprising:
from a secondary controller in a flyback converter, alerting a primary controller in the flyback converter of a short-circuit condition from the determination that the power supply voltage has dropped below a short circuit threshold voltage.

9. The method of claim 8, wherein alerting the primary controller comprises the second controller signaling the primary controller through an opto-coupler.

10. The method of claim 1, further comprising:
determining whether a power bus voltage on the power bus during the soft-start period has exceeded a power bus voltage rise threshold; and
fully switching on the power bus switch during the soft-start period responsive to the power bus voltage exceeding the power bus voltage rise threshold.

11. The method of claim 10, wherein fully switching on the power bus switch comprises charging a gate of a power bus switch transistor through a charge pump to a voltage greater than the power supply voltage.

12. A power converter, comprising:
an output capacitor having an output node for storing a power supply voltage;
a power bus switch transistor coupled between the output node and a power bus terminal for a power bus, the power bus being contained within a data cable for charging a device; and
a controller configured to softly switch on the power bus switch transistor at a beginning of a soft-start period responsive to a detection that the device has connected to the data cable for receiving power over the power bus, wherein the power bus switch transistor has a greater resistance when softly switched on than when fully switched on, the controller further configured to switch off the power bus switch transistor during the soft-start period responsive to a determination that the power supply voltage has dropped below a short circuit threshold voltage.

13. The power converter of claim 12, wherein the controller includes:
a state machine configured to detect a discharge of a configuration channel terminal to detect that the device has connected to the data cable;
a soft-start switch transistor having a first terminal coupled to the output node of the output capacitor:
a soft-start resistor coupled between a second terminal of the sort-start transistor and a gate of the power switch transistor, wherein the state machine is further configured to switch on the soft-start switch transistor to begin the soft-start period.

14. The power converter of claim 13, wherein the controller further includes:
a charge pump coupled between the output node of the capacitor and the gate of the power bus switch transistor, wherein the controller is further configured to enable the charge pump to charge the gate of the power bus switch transistor with a voltage greater than the power supply voltage responsive to a determination that there is no short circuit on the data cable.

15. The power converter of claim 14, wherein the controller further includes:
a comparator configured to compare a power bus voltage for the power bus to a power bus rise threshold voltage, wherein the determination that there is no short circuit on the data cable comprises a determination from the comparator that the power bus voltage has exceeded the power bus rise threshold voltage during the soft-start period.

16. The power converter of claim 12, wherein the power converter is a flyback converter.

17. The power converter of claim 16, wherein the data cable is a USB cable.

18. The power converter of claim 17, wherein the USB cable is a USB type C cable.

19. The power converter of claim 16, wherein the flyback converter includes a primary controller configured for primary only feedback.

20. The power converter of claim 12, wherein the power supply voltage is 5 volts and wherein the short circuit threshold voltage is 4 volts.

* * * * *